United States Patent
Xue et al.

(10) Patent No.: US 9,811,215 B2
(45) Date of Patent: Nov. 7, 2017

(54) TOUCH LIQUID CRYSTAL DISPLAY PANEL AND METHOD FOR MANUFACTURING THE SAME

(71) Applicant: Shenzhen China Star Optoelectronics Technology Co., Ltd., Shenzhen, Guangdong (CN)

(72) Inventors: Jingfeng Xue, Guangdong (CN); Gui Chen, Guangdong (CN); Xin Zhang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/418,616

(22) PCT Filed: Jan. 14, 2015

(86) PCT No.: PCT/CN2015/070691
§ 371 (c)(1),
(2) Date: May 10, 2016

(87) PCT Pub. No.: WO2016/106849
PCT Pub. Date: Jul. 7, 2016

(65) Prior Publication Data
US 2016/0246400 A1    Aug. 25, 2016

(30) Foreign Application Priority Data
Dec. 31, 2014   (CN) .......................... 2014 1 0855246

(51) Int. Cl.
*G06F 3/044*    (2006.01)
*G06F 3/041*    (2006.01)
*G02F 1/1333*   (2006.01)

(52) U.S. Cl.
CPC ............ *G06F 3/044* (2013.01); *G06F 3/0412* (2013.01); *G02F 1/13338* (2013.01); *G06F 2203/04103* (2013.01)

(58) Field of Classification Search
CPC ................... G06F 3/0412; G06F 3/044; G06F 2203/04103; G02F 1/13338
See application file for complete search history.

(56) References Cited

U.S. PATENT DOCUMENTS

2008/0239214 A1*  10/2008  Lee ..................... G02F 1/13338
                                                               349/106
2010/0110035 A1    5/2010  Selker
(Continued)

FOREIGN PATENT DOCUMENTS

CN          101593069 A        12/2009
CN          102473792 A         5/2012
(Continued)

OTHER PUBLICATIONS

International Search Report and Written Opinion, dated Jan. 14, 2015, China.

*Primary Examiner* — Vijay Shankar
*Assistant Examiner* — Abhishek Sarma
(74) *Attorney, Agent, or Firm* — Kim Winston LLP

(57) ABSTRACT

A touch liquid crystal display panel and a method for manufacturing the same are provided. The touch liquid crystal display panel comprises a sensing layer comprising a plurality of electrode regions arranged as an array, the electrode regions being electrically isolated from one another and respectively corresponding to a plurality of pixel units of a display region, and a wiring layer comprising a plurality of wires electrically connected with a control chip. The electrode regions each are electrically connected with a corresponding wire of the wiring layer through a via hole disposed adjacent to part of sub pixels of a correspond- (Continued)

Figure 1:
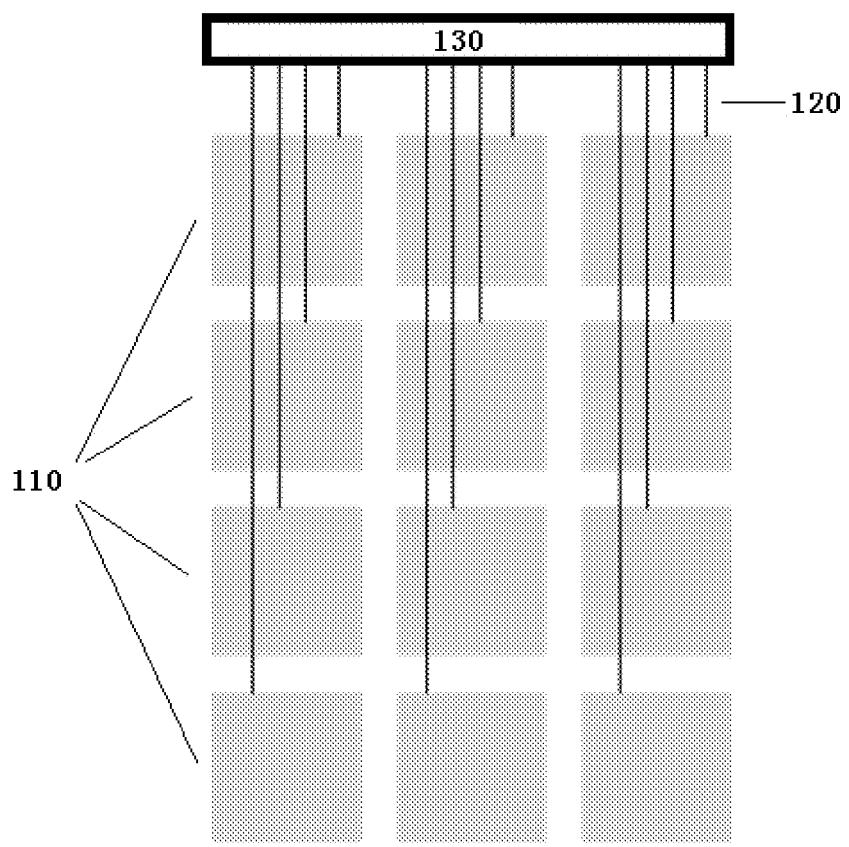

ing pixel unit, so that the control chip acquires an inductive signal of each of the electrode regions. In the present disclosure, only partial sub pixels are provided with via holes for forming electric contact of the electrode regions of the sensing layer with the wires of the wiring layer. The aperture ratio of the self-capacitive screen can be increased through reducing the number of via holes. In the meantime, the transmittance of the entire display panel can be improved.

10 Claims, 4 Drawing Sheets

(56) References Cited

U.S. PATENT DOCUMENTS

| | | | |
|---|---|---|---|
| 2013/0328812 A1* | 12/2013 | Kim | G06F 3/044 345/173 |
| 2014/0085222 A1* | 3/2014 | Park | G06F 3/0412 345/173 |
| 2014/0118299 A1 | 5/2014 | Wang et al. | |
| 2016/0306454 A1* | 10/2016 | Wang | G06F 3/0412 |

FOREIGN PATENT DOCUMENTS

| CN | 102667678 A | 9/2012 |
|---|---|---|
| CN | 104020910 A | 9/2014 |

\* cited by examiner

TOUCH LIQUID CRYSTAL DISPLAY PANEL AND METHOD FOR MANUFACTURING THE SAME

The present application claims benefit of Chinese patent application CN201410855246.7, entitled "A Touch Liquid Crystal Display Panel and A Method for Manufacturing the Same" and filed on Dec. 31, 2014, the entirety of which is incorporated herein by reference.

TECHNICAL FIELD

The present disclosure relates to the technical field of display, and in particular to a touch liquid crystal display panel based on self-capacitive sensing technology and a method for manufacturing the touch liquid crystal display panel.

TECHNICAL BACKGROUND

Touch screens in the market comprises separate type and in-cell type. A touch panel and a liquid crystal panel of a separate type touch screen need to be produced separately, and then assembled together. However, the touch screen made through this method has the defects of high cost and large size, as well as poor visibility due to the physical space between the touch panel and the liquid crystal panel that will reflect incoming light. As to an in-cell touch screen, a touch sensor is embedded in a liquid crystal display panel thereof, thereby incorporating touch function into the liquid crystal display panel. As compared with the separate type touch screen, the in-cell touch screen obviously has smaller size and better performance.

Further, in-cell touch screens can be divided into two types, namely self-capacitive screen and mutual capacitive screen. A single layer self-capacitive screen is the main research interests of an in-cell touch panel manufacturer. In the single layer self-capacitive screen, electrode units are usually arranged on a glass surface as an array, i.e., an electrode array is arranged. The electrode units in the electrode array are electrically isolated from one another, and each are coupled with the earth to form a capacitor. The capacitors formed are self capacitors. When the self-capacitive screen is touched by a finger, capacitance from the finger will be added to the screen capacitance, thereby increasing the capacitance value of the screen. In this case, the position touched by the finger, i.e., the coordinates of the finger, can be determined through detecting the changes of capacitance. The specific determination method is as follows: when being touched, the electrode array on the self-capacitive screen is scanned and detected successively in horizontal and vertical directions, and the horizontal and vertical ordinates thereof are respectively determined according to the changes in capacitance value before and after the touch, and then combined into a plane coordinates of the touch point. In other words, the touch point on the touch screen is projected respectively onto directions of an X axis and a Y axis through such scanning manner, and then the coordinates in the directions of the X axis and the Y axis are calculated, and finally combined into the coordinates of the touch point.

Figure 2:
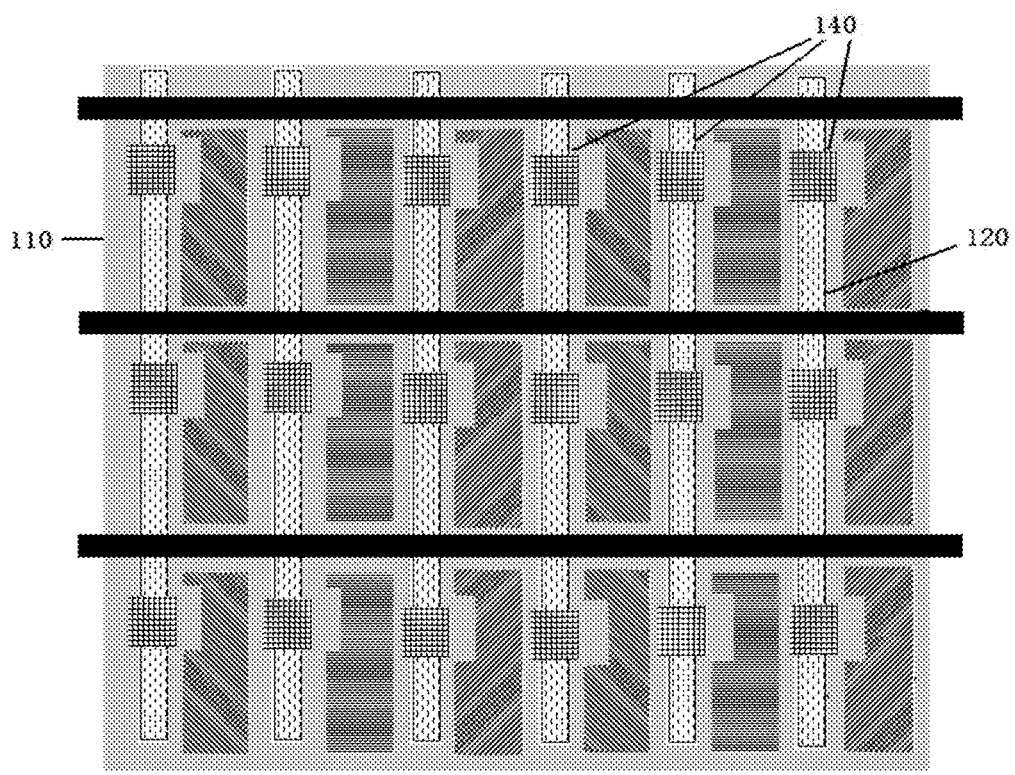

As shown in FIGS. 1 and 2, in a display region of an existing self-capacitive screen, a sensing layer made from transparent conductive material ITO is disposed under a pixel unit. The sensing layer is divided into a plurality of electrode regions each having the same area (about 5 mm×5 mm), which form the abovementioned electrode array. The electrode regions are electrically isolated from one another, and respectively correspond to six pixel units in the display region. The circuit connection schematically shown in FIG. 1 indicates that electrode regions 110 each need to be electrically connected with a control chip 130 through a separate wire 120, so that inductive signal (potential of voltage) of each electrode region 110 can be detected through the control chip 130. However, in the process of actual design and manufacturing, the electrode regions each are in bridge joint with the control chip through a via hole due to the limitation of manufacturing technology. In other words, a sub pixel of each pixel unit is provided with a via hole 140, so that the electrode region 110 under the pixel unit contacts the metal wire 120 above the pixel unit, which serves as an overline that is connected to the control chip 130, whereby the electrode region 110 can be electrically connected with the control chip 130. Specifically, as shown in FIG. 2, the metal wire 120 is disposed above a data line connected with each of the sub pixels, so as to avoid blocking the pixel electrode. In this case, although the problem of the detection and transmission of inductive signal is solved, part of the area of the pixel electrode is occupied due to the via hole, whereby an aperture ratio of the pixel electrode is reduced.

SUMMARY OF THE INVENTION

In order to solve the above problem, the present disclosure proposes a novel touch liquid crystal display panel with higher aperture ratio, and a method for manufacturing the touch liquid crystal display panel.

According to the present disclosure, a touch liquid crystal display panel is provided, comprising: a sensing layer comprising a plurality of electrode regions arranged as an array, the electrode regions being electrically isolated from one another and respectively corresponding to a plurality of pixel units of a display region, and a wiring layer comprising a plurality of wires electrically connected with a control chip, wherein the electrode regions each are electrically connected with a corresponding wire of the wiring layer through a via hole disposed adjacent to part of sub pixels of a corresponding pixel unit, so that the control chip acquires an inductive signal of each of the electrode regions.

According to an embodiment of the present disclosure, the wire is disposed above a data line connected with the sub pixel which is provided with the via hole.

According to an embodiment of the present disclosure, the wire is disposed above a gate line and above the data line connected with the sub pixel which is provided with the via hole.

Further, according to an embodiment of the present disclosure, the via hole is disposed adjacent to a blue sub pixel.

Alternatively, according to another embodiment of the present disclosure, the via hole is disposed adjacent to a red sub pixel and/or a green sub pixel.

According to an embodiment of the present disclosure, the electrode region is made of transparent conductive material, and the wire is made of metallic material.

According to an embodiment of the present disclosure, a thin film transistor layer comprising a gate metal layer, a semiconductor layer, and a source and drain metal layer is disposed between the sensing layer and the wiring layer.

The present disclosure further relates to a method for manufacturing a touch liquid crystal display panel, comprising the steps of: forming a pixel unit in a display region, and providing a via hole adjacent to part of sub pixels of the pixel unit; forming a sensing layer, in which a plurality of electrode regions is arranged as an array, the electrode regions being electrically isolated from one another and respectively corresponding to a plurality of pixel units of the display region; forming a wiring layer, in which a plurality of wires electrically connected with a control chip is disposed; and electrically contacting each of the electrode regions of the sensing layer with a corresponding wire in the wiring layer through a via hole of a corresponding pixel unit, so that the control chip acquires an inductive signal of each of the electrode regions.

Further, according to an embodiment of the present disclosure, the via hole is disposed adjacent to a blue sub pixel.

Alternatively, according to another embodiment of the present disclosure, the via hole is disposed adjacent to a red sub pixel and/or a green sub pixel.

According to an embodiment of the present disclosure, the wire is disposed above a gate line and above a data line connected with the sub pixel which is provided with the via hole.

As compared with the prior art, one or more embodiments can have the following advantages.

According to the present disclosure, only partial sub pixels (preferably blue sub pixels) are provided with via holes for forming electric contact of the electrode regions of the sensing layer with the wires of the wiring layer. The aperture ratio of the self-capacitive screen can be increased through reducing the number of via holes. In the meantime, the transmittance of the entire display panel can be improved.

Other features and advantages of the present disclosure will be further explained in the following description and partially become self-evident therefrom, or be understood through the embodiments of the present disclosure. The objectives and advantages of the present disclosure will be achieved through the structure specifically pointed out in the description, claims, and the accompanying drawings

BRIEF DESCRIPTION OF THE ACCOMPANYING DRAWINGS

Figure 3:
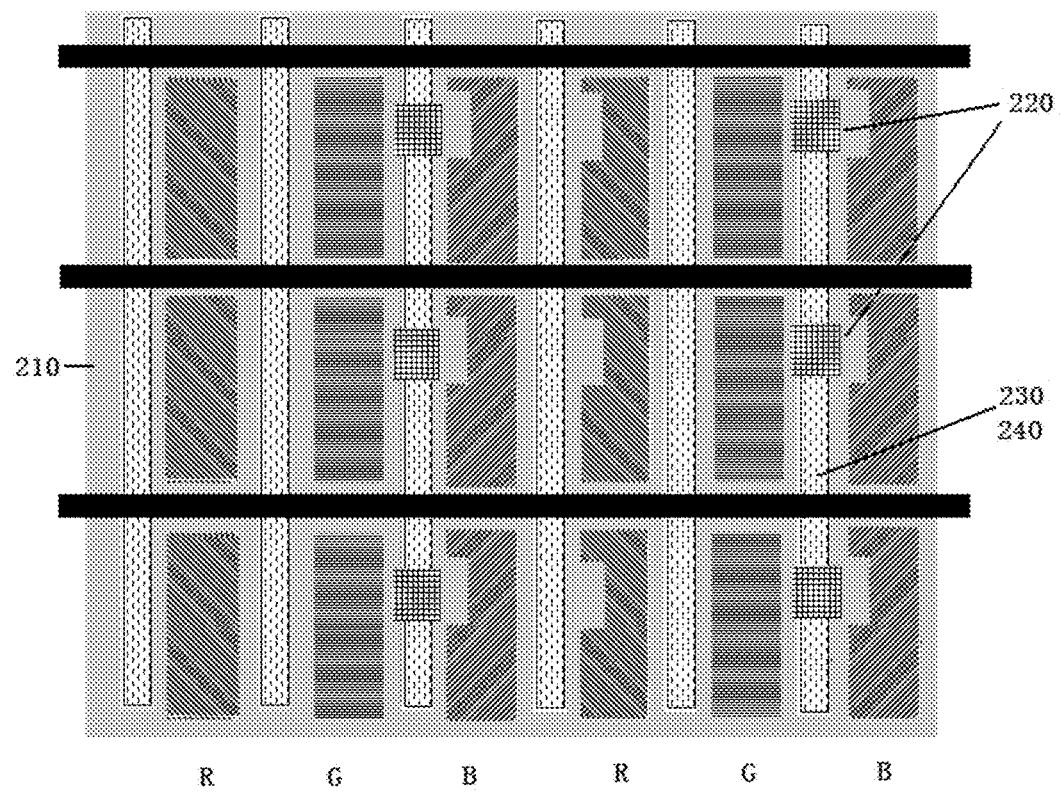
Figure 4:
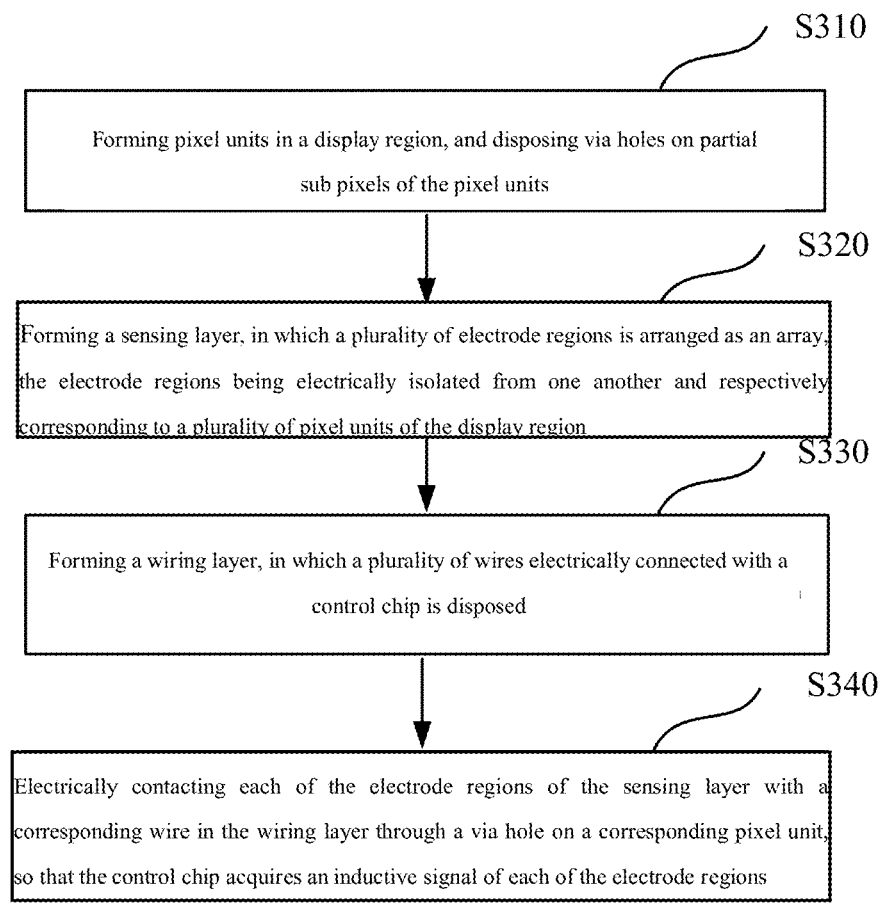

The accompanying drawings, which constitute a part of the description, are used to further illustrate the present disclosure in conjunction with the embodiments. It should be understood that the accompanying drawings should not be construed as limitations to the present disclosure. In the drawings:

FIG. 1 schematically shows a circuit connection of an electrode sensing layer of an existing touch liquid crystal display panel, FIG. 2 shows a top view of part of a display region of the existing touch liquid crystal display panel, FIG. 3 shows a top view of part of a display region of a touch liquid crystal display panel according to an example of the present disclosure, and FIG. 4 shows a flow chart of a method for manufacturing the touch liquid crystal display panel according to the example of the present disclosure.

DETAILED DESCRIPTION OF THE EMBODIMENTS

In order to increase an aperture ratio of a pixel electrode, the present disclosure proposes a novel touch liquid crystal display panel. Only partial sub pixels are provided with via holes, so that electrical contact can be formed between electrode regions of a sensing layer and wires of a wiring layer.

EXAMPLE 1

FIG. 3 shows a top view of part of a display region of a touch liquid crystal display panel according to an example of the present disclosure. It should be noted that FIG. 3 is only a schematic view. In actual application, the touch sensing layer can be embedded in different positions of the liquid crystal display panel through different methods, and forms an in-cell touch panel of stacked structure together with other function layers. As shown in FIG. 3, according to an example of the present disclosure, the sensing layer is disposed under a thin film transistor layer, and a corresponding wiring layer is disposed above the thin film transistor layer. Of course, other function layers can be further disposed between the sensing layer and the wiring layer. Alternatively, as to the thin film transistor layer, layers, such as an insulation layer, can be further disposed between a gate metal layer, a semiconductor layer, and a source and drain metal layer of the display panel. However, because the abovementioned layers are not the key points of the present disclosure, nor the object claimed by the present disclosure, thus will not be described in detail here.

As shown in FIG. 3, in the display region of the liquid crystal display panel, the sensing layer under the thin film transistor layer (i.e., pixel units) is divided into a plurality of electrode regions 210, which are electrically isolated from one another. In this example, the electrode regions 210 each have a same area of about 5 mm×5 mm, and respectively correspond to six pixel units (arranged in three rows and two columns) in the display region. Each pixel unit comprises three sub pixels respectively of the three primary colors, namely red, green, and blue, which are indicated as R, G, and B in FIG. 3. Different from an existing touch liquid crystal display panel, according to the example of the present disclosure, only part of sub pixels are provided with via holes 220 for electrically contacting the electrode regions of the sensing layer with the wires of the wiring layer. Further, the via hole 220 is preferably disposed adjacent to a blue sub pixel for electrically contacting the electrode region of the sensing layer with the wire of the wiring layer. According to the technical solution of the present disclosure, although the technical effect of increasing the aperture ratio can also be achieved through disposing via holes 220 only adjacent to a red sub pixel and/or a green sub pixel, the arrangement of via hole only adjacent to the blue sub pixel can not only increase the aperture ratio, but also improve the transmittance of the entire display panel, because the brightness of blue among the three primary colors is the smallest.

Correspondingly, in the wiring layer above the thin film transistor layer (i.e., pixel unit), a metal wire 230 for guiding inductive voltage of the electrode regions to the control chip (not shown) can be disposed above a data line 240 with which a sub pixel provided with a via hole is connected, such as overlapping the data line 240, so that an active area of the pixel electrode will not be occupied, whereby the aperture ratio will not be influenced.

EXAMPLE 2

Generally, the sensing layer is made of transparent conductive material (for example ITO) which has relatively large impedance, and the wiring layer is made of metallic material which has relatively small impedance. In the prior art, the electrode regions are kept in parallel connection with the metal wires through via holes adjacent to the pixel units, so that the technical effect of reducing the overall impedance can be achieved. In other words, the metal wires, which bridge joint the electrode regions with the control chip, also play an important role of reducing the impedance.

According to example 1, the number of via holes is reduced so as to increase the aperture ratio, thus the number of metal wires in the wiring layer is reduced accordingly. In this case, the original parallel connection of resistance value is altered, causing the overall impedance to be increased. As a result, the circuit loss is further increased. Therefore, the inventor of the present disclosure proposes that the metal wires in the wiring layer should be retained to the largest extent. As for example 1, the metal wire can be arranged above a scan line of each pixel unit and to be electrically connected with the metal wire above a data line of the blue sub pixel, so that overall impedance can be reduced.

EXAMPLE 3

A method for manufacturing said touch liquid crystal display panel is proposed according to example 3 of the present disclosure, comprising the following steps.

In step S310, a pixel unit is formed in a display region, and a via hole is disposed in part of the sub pixels of the pixel units.

In step S320, a sensing layer, in which a plurality of electrode regions is arranged as an array, is formed. The electrode regions are electrically isolated from one another, and respectively correspond to a plurality of pixel units of the display region.

In step S330, a wiring layer, in which a plurality of wires electrically connected with a control chip is disposed, is formed.

In step S340, each of the electrode regions of the sensing layer is in electrical contact with a corresponding wire in the wiring layer through a via hole of a corresponding pixel unit, so that the control chip can acquire an inductive signal of each of the electrode regions.

As analyzed above, in a preferred example, via holes are disposed on blue sub pixels, and the wires each are disposed above a gate line and above the data line connected with the sub pixel which is provided with the via hole.

The above embodiments are described only for better understanding, rather than restricting, the present disclosure. Any person skilled in the art can make amendments to the implementing forms or details without departing from the spirit and scope of the present disclosure. The scope of the present disclosure should still be subjected to the scope defined in the claims.

The invention claimed is:

1. A touch liquid crystal display panel, comprising:
a sensing layer comprising a plurality of electrode regions arranged as an array, the electrode regions being electrically isolated from one another and respectively corresponding to a plurality of pixel units of a display region, and
a wiring layer comprising a plurality of wires electrically connected with a control chip,
wherein the electrode regions each are electrically connected with a corresponding wire of the wiring layer through a via hole disposed adjacent to part of sub pixels of a corresponding pixel unit, so that the control chip acquires an inductive signal of each of the electrode regions,
wherein the wire is disposed above a gate line and above a data line connected with the sub pixel which is provided with the via hole, and
the wire arranged above a scan line of each pixel unit can be electrically connected with the wire above a data line connected with the sub pixel which is provided with the via hole.

2. The touch liquid crystal display panel according to claim 1, wherein the via hole is disposed adjacent to a blue sub pixel.

3. The touch liquid crystal display panel according to claim 1, wherein the via hole is disposed adjacent to a red sub pixel and/or a green sub pixel.

4. The touch liquid crystal display panel according to claim 1, wherein the electrode region is made of transparent conductive material, and the wire is made of metallic material.

5. The touch liquid crystal display panel according to claim 2, wherein the electrode region is made of transparent conductive material, and the wire is made of metallic material.

6. The touch liquid crystal display panel according to claim 3, wherein the electrode region is made of transparent conductive material, and the wire is made of metallic material.

7. The touch liquid crystal display panel according to claim 1, wherein a first insulation layer, a gate metal layer, a second insulation layer, a semiconductor layer, a source and drain metal layer, and a third insulation layer are disposed between the sensing layer and the wiring layer.

8. A method for manufacturing a touch liquid crystal display panel, comprising steps of:
forming a pixel unit in a display region, and providing a via hole adjacent to part of sub pixels of the pixel unit;
forming a sensing layer, in which a plurality of electrode regions is arranged as an array, the electrode regions being electrically isolated from one another and respectively corresponding to a plurality of pixel units of the display region;
forming a wiring layer, in which a plurality of wires electrically connected with a control chip is disposed; and
electrically contacting each of the electrode regions of the sensing layer with a corresponding wire in the wiring layer through a via hole of a corresponding pixel unit, so that the control chip acquires an inductive signal of each of the electrode regions,
wherein the wire is disposed above a gate line and above a data line connected with the sub pixel which is provided with the via hole, and
the metal wire arranged above a scan line of each pixel unit can be electrically connected with the metal wire above a data line connected with the sub pixel which is provided with the via hole.

9. The method according to claim 8, wherein the via hole is disposed adjacent to a blue sub pixel.

10. The method according to claim 8, wherein the via hole is disposed adjacent to a red sub pixel and/or a green sub pixel.

* * * * *